McCambridge & Martin.
Car-Brake.
N° 80420.    Patented Jul. 28, 1868.
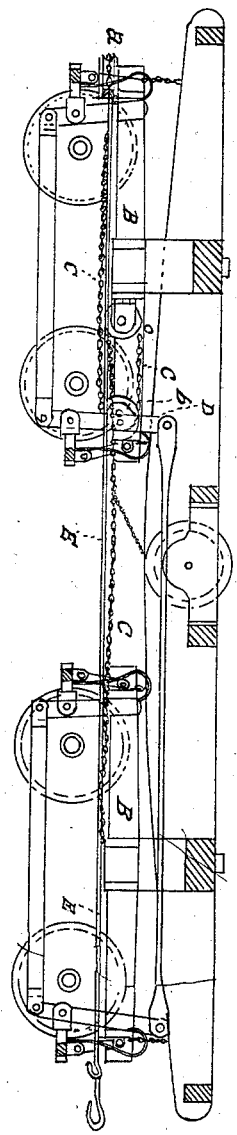
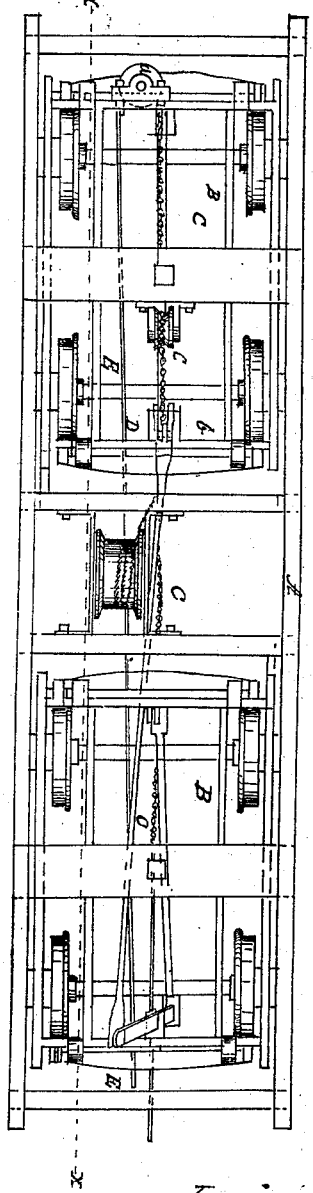
Witnesses
Stephen Ustick
M. H. Emery
Inventors.
Saml. McCambridge
Edward G. Martin

United States Patent Office.

SAMUEL McCAMBRIDGE AND EDWARD G. MARTIN, OF PHILADELPHIA, PENNSYLVANIA.

*Letters Patent No. 80,420, dated July 28, 1868.*

IMPROVED CAR-BRAKE.

*The Schedule referred to in these Letters Patent and making part of the same.*

TO ALL WHOM IT MAY CONCERN:

Be it known that we, SAMUEL McCAMBRIDGE and EDWARD G. MARTIN, of the city and county of Philadelphia, and State of Pennsylvania, have invented a new and useful Improvement in Operating the Brake-Levers of a Train of Cars; and we do hereby declare that the following is a full and exact description thereof, reference being had to the accompanying drawings, and to the letters of reference marked thereon.

The nature of our invention consists in the combination of a pulley with the rear truck of the last car of the train, and connecting one end of the continuous chain for operating the brake-levers with the front truck, weaving the chain around the sheaves of the levers, and the stationary sheaves under all the cars, passing it around the said pulley or sheave, and thence directly to the engine, and then connecting it with a revolving shaft, operated by the engine. By this means we effectually take up the slack of the continuous chain under the rear car first, and so on in succession, until the first car is reached, and completely prevent the bumping of the cars.

In the accompanying drawings, which make a part of this specification—

Figure 1 is a plan of the rear car with the improvement attached.

Figure 2 is a longitudinal section of the same at $x\,x$, fig. 1.

Like letters in both figures indicate the same parts.

A is the bottom frame of the last car of the train.

B B are the trucks.

C is a continuous chain, which is passed around the pulley or sheave $a$, woven around the sheaves $b$ of the brake-levers D and the fixed sheaves $c$, as represented in the drawings, and continued throughout all the cars, the end being secured to the front truck. From the sheave $a$ the chain is passed directly to the engine, and is connected to a revolving shaft, which has a geared connection with one of the axles of the same, by which it is operated.

As the connection of the continuous chain with the engine is fully described in the patent dated February 5, 1867, a further description is deemed unnecessary.

After the chain has passed the pulley $a$, in its slacked condition, a succession of rods, E, may take the place of the chain, except enough to wind around the shaft in the operation of the brakes, the rods having a hooked connection with each other for readily connecting and disconnecting the cars, when required.

The operation is as follows: When the brakes are to be applied, the engineer, by means of a lever, brings the chain-shaft into connection with the engine, for tightening the continuous chain. An endless chain may be used in lieu thereof. As the slack of the chain under the rear car is first taken up, the car spreads from the car in front of it, and its brakes are operated, and a like operation is effected with all the cars in succession, until the front car is reached and operated upon in like manner, it spreading out from the engine. Thus the bumping of the cars, in stopping the train, is completely obviated.

What we claim as our invention, and desire to secure by Letters Patent, is—

The arrangement of the continuous chain C and its described connecting-rods, when the same is fastened at one end to the front car or truck, and operates, in combination with a fixed sheave or pulley, on the rear truck, through a rod or chain connecting directly with the actuating-devices on the engine, all as and for the purpose set forth.

In testimony that the above is our invention, we have hereunto set our hands, and affixed our seals, this twenty-sixth day of March, 1868.

SAML. McCAMBRIDGE. [L. S.]
EDWARD G. MARTIN. [L. S.]

Witnesses:
STEPHEN USTICK,
JOHN WHITE.